UNITED STATES PATENT OFFICE.

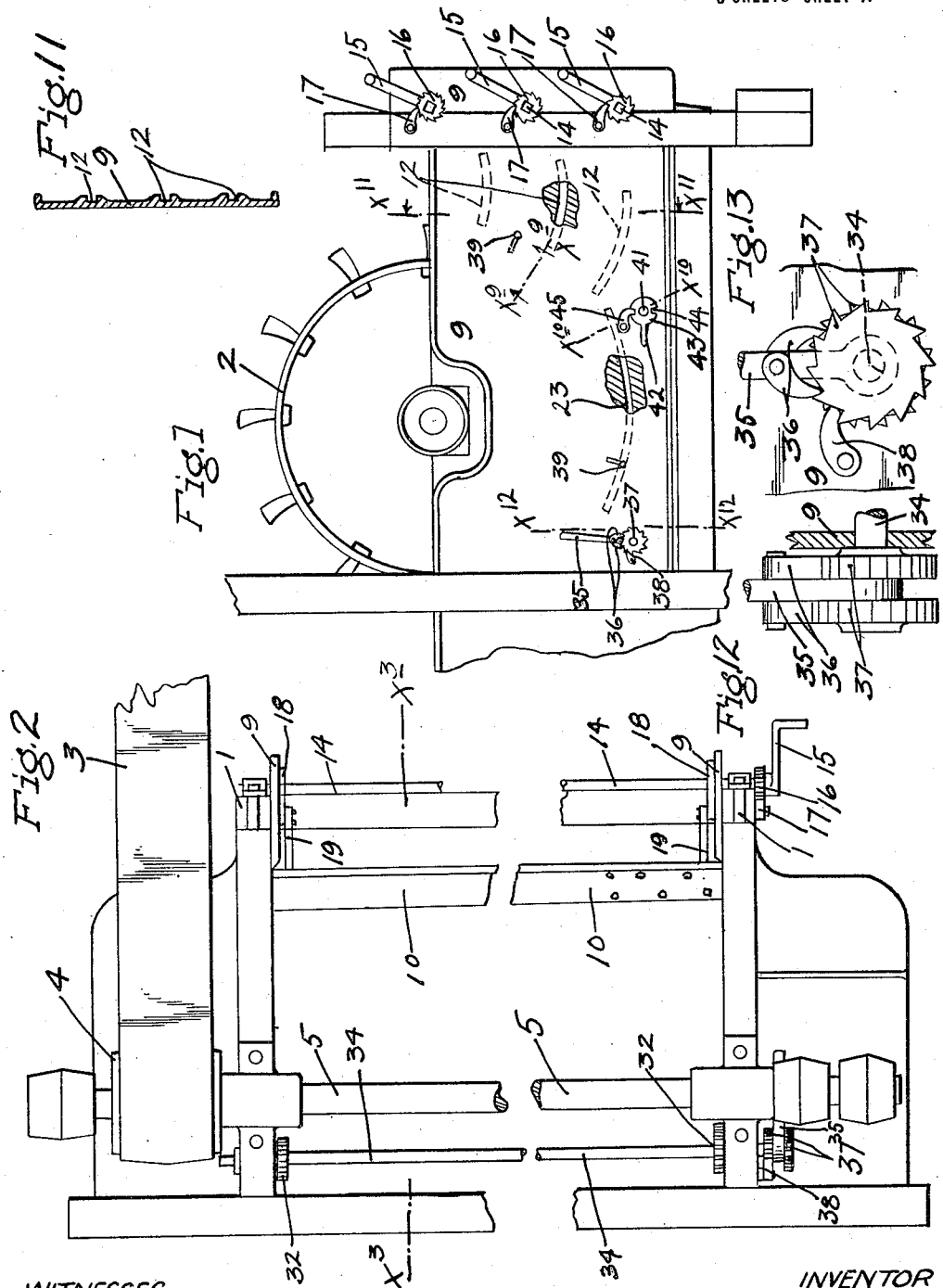

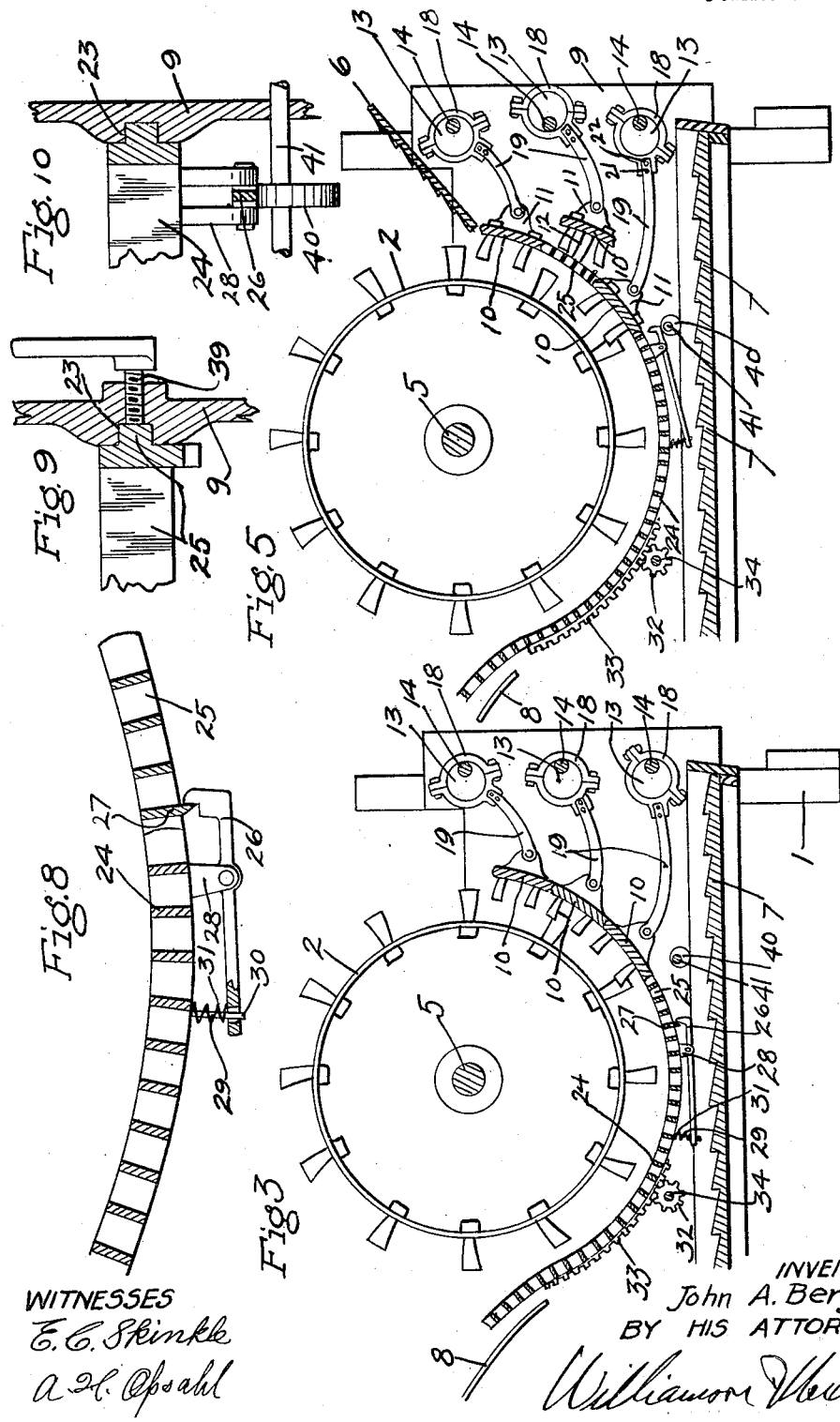

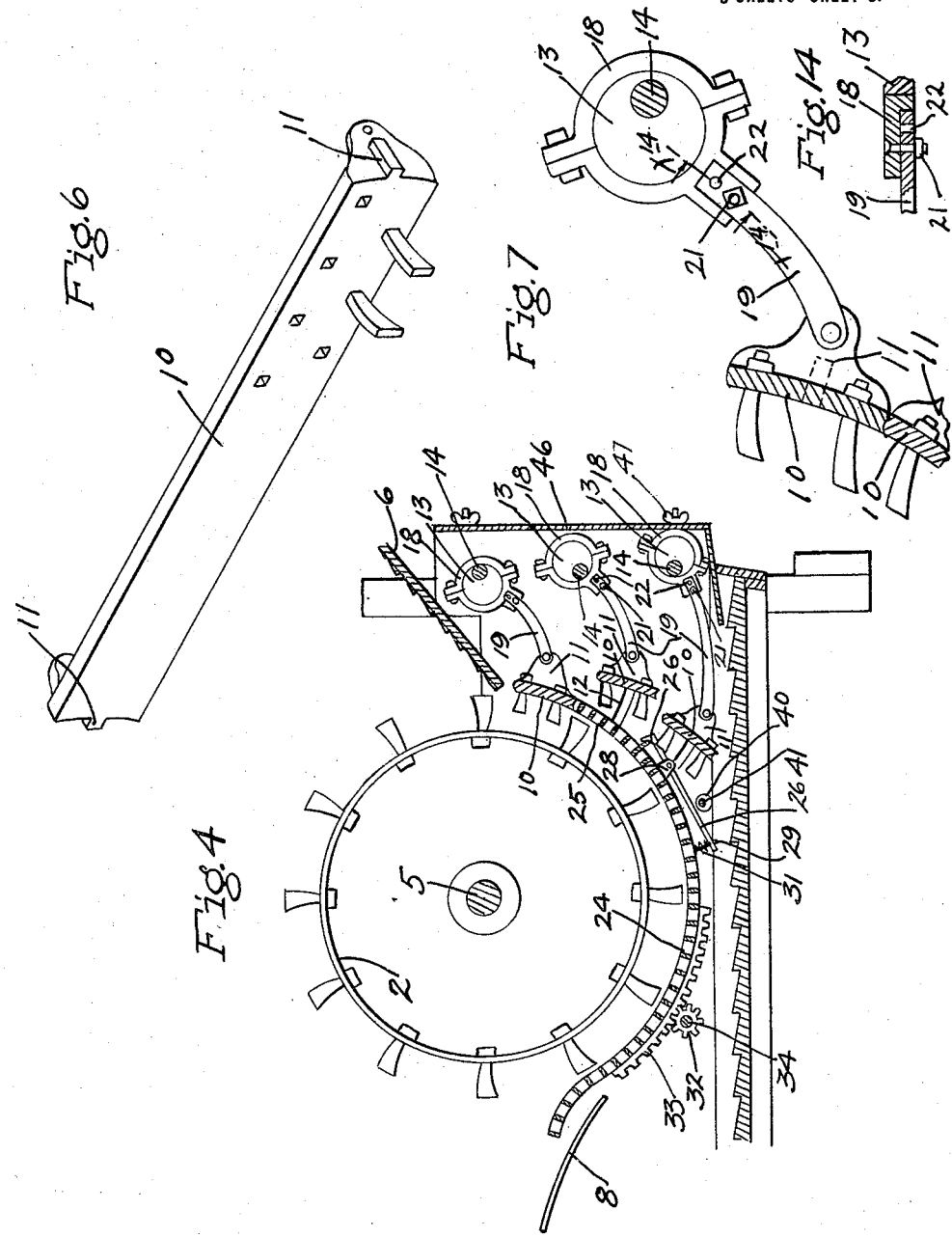

JOHN A. BERGREN, OF LAKE PARK, MINNESOTA, ASSIGNOR OF ONE-TENTH TO ALFRED F. YOUNGBERG AND TWO-FIFTHS TO HERMAN S. WILSON, BOTH OF LAKE PARK, MINNESOTA.

THRESHING-MACHINE.

1,138,835. Specification of Letters Patent. Patented May 11, 1915.

Application filed May 16, 1914. Serial No. 838,988.

*To all whom it may concern:*

Be it known that I, JOHN A. BERGREN, a citizen of the United States, residing at Lake Park, in the county of Becker and State of Minnesota, have invented certain new and useful Improvements in Threshing-Machines; and I do hereby declare the following to be a full, clear, and exact description of the invention, such as will enable others skilled in the art to which it appertains to make and use the same.

My invention relates to improvements in threshing machines, and has for its object to improve the concave and grate structure; and, to this end, it consists of the novel devices and combinations of devices hereinafter described and defined in the claims.

In the accompanying drawings, which illustrate the invention, like characters indicate like parts throughout the several views.

Referring to the drawings, Figure 1 is a side elevation of the front end portion of a threshing machine, having incorporated therein the improved concave and grate; Fig. 2 is a plan view of the same, with some parts removed and some parts broken away; Fig. 3 is a longitudinal vertical section taken on the line $x^3$ $x^3$ of Fig. 2, showing all of the concave sections in working positions; Fig. 4 is a view corresponding to Fig. 3, with the exception that two of the concave sections have been moved to inoperative positions, and the grate moved into a position to carry the supplemental section thereof into a position to take the place of the intermediate concave section; Fig. 5 is a view corresponding to Fig. 4, with the exception that the main grate has been moved a distance sufficient to permit the lower concave section to be returned to an operative position between said grate and its supplemental sections; Fig. 6 is a perspective view of one of the concave sections, some parts being removed; Fig. 7 is a detail view, partly in side elevation and partly in section, of two of the concave sections and the operating means for one of said sections, some parts being broken away; Fig. 8 is a detail view, principally in longitudinal section, taken through the main grate and its supplemental section; Fig. 9 is a detail view, principally in section, taken on the line $x^9$ $x^9$ of Fig. 1; Fig. 10 is a detail view, in section, taken on the line $x^{10}$ $x^{10}$ of Fig. 1; Fig. 11 is a transverse vertical section taken on the line $x^{11}$ $x^{11}$ of Fig. 1; Fig. 12 is a detail view, partly in transverse vertical section and partly in edge elevation; Fig. 13 is a side elevation of the parts shown in Fig. 12; and Fig. 14 is a detail view, in section, taken on the line $x^{14}$ $x^{14}$ of Fig. 7.

Of the parts of the threshing machine illustrated for the purpose of showing my invention applied in working position, it is only necessary to note the frame 1, tooth-equipped cylinder 2, driving belt 3, which runs over a pulley 4 on the shaft 5 of the cylinder 2, the feeder pan 6, the grain pan 7, and the stationary finger grate 8.

As shown, the bearings for the shaft 5 are mounted on the upper horizontal edges of a pair of laterally spaced side plates 9, bolted, or otherwise rigidly secured, one to each side of the frame 1. The concave is made up of three tooth-equipped sections, which extend the full width of the cylinder 2. These concave sections 10 are mounted for independent bodily movements toward and from the cylinder 2, and have integrally formed on their ends lugs 11, slidably mounted in guide channels 12 formed in the inner faces of the side plates 9. The upper longitudinal edges of the concave sections 10 are formed convex in cross section, while their lower longitudinal edges are concave, so that the abutting edges of said concave sections will interlock, one with the other, when in operative positions. Opposite pairs of the guide channels 12 are vertically spaced, one above the other, and are so arranged as to hold the concave sections 10 interlocked when in operative positions, and to require the same to be successively moved to and from operative positions. To move the concave sections 10 from operative to inoperative positions, it is necessary to start with the lowermost thereof, and to reverse the order in moving said sections from inoperative to operative positions.

Various means may be employed for independently moving the concave sections 10 to and from operative positions, and for setting the same in different operative positions with respect to the cylinder 2. To accomplish these adjustments, is shown pairs of eccentrics 13 keyed to shafts 14 vertically spaced, one above the other, and journaled in the side plates 9. These shafts 14 are rotated by means of hand cranks 15 secured to the outer right-hand ends thereof, and are held in different set positions by means of ratchet wheels 16 and coöperating lock dogs 17. The ratchet wheels 16 are rigidly secured to the shafts 14, adjacent to the cranks 15, and the lock dogs 17 are pivoted to one of the side plates 9. Two-part eccentric straps 18 are mounted on the eccentrics 13, and are connected to the concave sections 10 by arms 19. The outer ends of these arms 19 are pivotally secured to lugs 11 integrally formed with the outer end portions of the concave sections 10, and their inner ends are mounted in seats formed in the eccentric straps 18 and detachably secured thereto by nut-equipped bolts 21 and short studs 22. By thus detachably connecting the arms 19 to the eccentric straps 18, the concave sections 10 may be detached from their operating connections, at will, in case it is necessary or desirable to remove the same from the threshing machine.

It is important to note that the bottoms of the guide channels 12 are flush with the inner faces of the side plates 9, and their outer ends terminate intermediately between the operative positions of the concave sections 10 and the shafts 14, to permit the lugs 11 of the concave sections 10 to be removed from said channels. After the concave sections 10 are free from the guide channels 12, they may be moved or turned in various positions to pass the same between the shafts 14.

A pair of opposite guide channels 23 are formed in the inner faces of the side plates 9, substantially concentric with the cylinder 2 and intersecting the inner ends of the guide channels 12. Slidably mounted in the guide channels 23, for movement toward and from the concave sections 10, is a main grate 24 having a supplemental grate section 25. This supplemental grate section is also slidably mounted in the guide channels 23, and is located between the main grate 24 and the concave sections 10. The outer and inner longitudinal edges of the supplemental grate section 25 are formed concave and convex, respectively, so as to interlock with the concave sections 10. This grate section is of the same width as the concave sections 10, in order to permit the same to take the place of any one of said concave sections, when the same is moved into an inoperative position.

When forming a part of the main grate, the supplemental section 25 is detachably locked thereto by a hook latch 26 and coöperating latch lug 27. The hook latch 26 is intermediately pivoted to a depending lug 28 integrally formed with the main grate 24, and the latch lug 27 is integrally formed and depends from one of the grate bars of the supplemental grate section 25. Depending from the under side of the main grate 24, is a pin 29 which works through a perforation 30 formed in the free end of the hook latch 26. Mounted on this pin 29, and compressed between the main grate 24 and the hook latch 26, is a coiled spring 31, which yieldingly holds said hook latch interlocked with the latch lug 27. To permit the main grate 24 and its supplemental section to be automatically locked, when brought together, the hook latch 26 and latch lug 27 are formed with reversely beveled surfaces, so arranged as to cause said hook latch to be cammed past the latch lug.

The main grate 24 is positively moved in the guide channels 24 by a pair of pinions 32, which mesh with segmental racks 33 secured to the under side of said grate. These pinions 32 are rigidly secured to a transverse shaft 34 journaled in the side plates 9. Rotary motion is imparted to the shaft 34, in either direction, by a lever 35 carrying a pair of reversely projecting pawls 36, arranged for coöperation with a pair of reversely formed ratchet wheels 37 rigidly secured to the shaft 34. As best shown in Fig. 12, the lever 35 is loosely journaled on the shaft 34 between the ratchet wheels 37. To lock the shaft 34 against rotation in a direction to prevent the grate 24 from moving away from the concave sections 10, a lock dog 38 is pivoted to one of the side plates 9, and arranged to be thrown into engagement with one of the ratchet wheels 37. The width of the main grate 24 is such that the same always extends over the free ends of the grate fingers 8, irrespective of the position of said grate.

When the supplemental grate section 25 is moved into a position to take the place of the intermediate concave section 10, the same is securely locked in the guide channels 23 by a lever-equipped jam screw 39. This screw has threaded engagement with one of the side plates 9, and its inner end is arranged to impinge against the adjacent reduced face of the supplemental grate section 25, which slides in guide channels 23. After said supplemental grate section is locked in position, the hook latch 26 is released from the latch lug 27 by a cam 40 secured to a shaft 41 journaled in the side plates 9. This cam 40 is arranged to operate on the spring-pressed end of the latch hook 26 when the main grate 24 is moved into a position, as shown in Fig. 4. The shaft 41 is oscillated to carry the cam 40 into operative and inoperative positions by a hand crank 42, rigidly secured to the outer right-hand end of said shaft. Integrally formed on the hand crank 42, and concentric with the shaft 40, is an annular head 43 having a pair of diametrically opposite notches 44. For locking the cam 40 in either of its two positions, a lock dog 45 is pivoted to one of the side plates 9 and arranged to be turned into interlocking engagement with either one of the notches 44, depending on the position of the cam 40.

The front end of the threshing machine is normally closed by an end gate 46, detachably secured to the outer vertical edges of the side plates 9 by thumb-nut-equipped studs 47.

From the foregoing description, it is evident that the concave sections 10 may be independently moved to and from operative positions, and may be set in different operative positions in respect to the cylinder 2, by the operation of the eccentrics 13. It is also evident that, by removing the end gate 46 and detaching the concave sections 10 from their operating connections, said concave sections may be readily removed through the front end of the machine, without disturbing either the feeder pan 6 or any other of the operative parts of the machine. So far as I am aware, I am the first to remove a concave, comprising a plurality of sections, through the front end of a threshing machine and below the feeder pan 6. By mounting the concave sections for movements toward and from the cylinder 2, either one, two or three of said sections may be used, depending on the kind of grain being threshed and the condition of the grain, whether wet or dry. When two concave sections are used, as shown in Fig. 5, the supplemental grate section 25, commonly known as a "blank," is mounted between said two concave sections, in place of the intermediate concave section. When one concave section is used, the main grate and its supplemental section take the place of the two concave sections moved to inoperative positions, as shown in Fig. 4. In case the straw clogs between the cylinder and concaves, it is an extremely simple matter to throw all of the concave sections into inoperative positions, to release the clogged straw, thus saving a great deal of time and expense. When machines now in use clog with straw, it is necessary to dig out the clogged straw by hand, which requires considerable time.

By the use of my improved concave sections, the same are always carried within the machine ready for use, and the same may be adjusted in true parallelism with the cylinder in opening and closing the concave sections in respect to the cylinder. By this parallel adjustment of the concave sections in respect to the cylinder, said concave sections may be opened up to a sufficient extent to adapt the machine for threshing beans, which is impossible with ordinary concaves, as all sections thereof cannot be adjusted far enough away from the cylinder. In threshing beans, it is necessary to have a relatively wide opening between the cylinder and concaves.

What I claim is:

1. In a threshing machine, the combination with a tooth-equipped cylinder, of a concave, comprising a plurality of tooth-equipped sections, for coöperation with said cylinder, certain of said concave sections being mounted for movements toward and from said cylinder, and a grate, mounted for substantially concentric movement in respect to said cylinder, said grate having a supplemental section mounted for like movement therewith, arranged to take the place of any one of the movably mounted concave sections, when moved to an inoperative position, and to be separated from said grate to permit one of said movably mounted concave sections to be inserted therebetween.

2. In a threshing machine, the combination with a tooth-equipped cylinder, of a concave, comprising a plurality of tooth-equipped sections, for coöperation with said cylinder, certain of said concave sections being mounted for movements toward and from said cylinder, a grate, mounted for substantially concentric movement in respect to said cylinder, said grate having a supplemental section arranged to take the place of any one of the movably mounted concave sections, when moved to an inoperative position, and means for locking said supplemental grate section in a predetermined set position, when taking the place of one of the movably mounted concave sections.

3. In a threshing machine, the combination with a tooth-equipped cylinder, of a concave, comprising a plurality of tooth-equipped sections, for coöperation with said cylinder, certain of said concave sections being mounted for movements toward and from said cylinder, a grate, mounted for substantially concentric movement in respect to said cylinder, said grate having a supplemental section arranged to take the place of any one of the movably mounted concave sections, when moved to an inoperative position, and means for locking said supplemental section to said grate for common movement therewith toward and from said concave sections.

4. In a threshing machine, the combination with a tooth-equipped cylinder, of a concave, comprising a plurality of tooth-equipped sections, for coöperation with said cylinder, certain of said concave sections being mounted for movements toward and from said cylinder, a grate, mounted for substantially concentric movement in respect to said cylinder, said grate having a supplemental section arranged to take the place of any one of the movably mounted concave sections, when moved to an inoperative position, means for locking said supplemental section to said grate for common movement therewith toward and from said concave sections, and means, operative, at will, for releasing said supplemental section from said grate.

5. In a threshing machine, the combination with a tooth-equipped cylinder, of a concave, comprising a plurality of tooth-equipped sections, for coöperation with said cylinder, certain of said concave sections being mounted for bodily movements to and from operative positions, said concave sections, when in operative positions, having interlocking engagement one with the other.

6. In a threshing machine, the combination with a tooth-equipped cylinder, of a concave, comprising a plurality of tooth-equipped sections, for coöperation with said cylinder, certain of said concave sections being mounted for bodily movements to and from operative positions, said concave sections, when in operative positions, having interlocking engagement one with the other, and means for successively moving said movably mounted concave sections to and from interlocked operative positions.

7. In a threshing machine, the combination with a tooth-equipped cylinder, of a concave, comprising a plurality of tooth-equipped sections, for coöperation with said cylinder, certain of said concave sections being mounted for movement to and from operative positions, and a grate mounted for substantially concentric movement in respect to said cylinder, said grate having a supplemental section movable therewith, arranged to take the place of any one of said movably mounted concave sections, when in an in-operative position, and to be separated from said grate to permit one of said movably mounted concave sections to be inserted therebetween.

8. In a threshing machine, the combination with a tooth-equipped cylinder, of a concave, comprising a plurality of tooth-equipped sections, for coöperation with said cylinder, certain of said concave sections being mounted for movement to and from operative positions, a grate mounted for substantially concentric movement in respect to said cylinder, said grate having a supplemental section, arranged to take the place of any one of said movably mounted concave sections, when in an in-operative position, and means connecting said grate and supplemental section for common movement, one with the other.

9. In a threshing machine, the combination with a tooth-equipped cylinder, of a concave, comprising a plurality of tooth-equipped sections, for coöperation with said cylinder, certain of said concave sections being mounted for movement to and from operative positions, a grate mounted for substantially concentric movement in respect to said cylinder, said grate having a supplemental section, arranged to take the place of any one of said movably mounted concave sections, when in an in-operative position, and a lock for automatically connecting said grate and supplemental section when brought together.

10. In a threshing machine, the combination with a tooth-equipped cylinder, of a concave, comprising a plurality of tooth-equipped sections, for coöperation with said cylinder certain of said concave sections being mounted for movement to and from operative positions, a grate mounted for substantially concentric movement in respect to said cylinder, said grate having a supplemental section, arranged to take the place of any one of said movably mounted concave sections, when in an in-operative position, a lock for automatically connecting said grate and supplemental section when brought together, and means for releasing said lock from a distant point.

In testimony whereof I affix my signature in presence of two witnesses.

JOHN A. BERGREN.

Witnesses:
 ALICE L. KING,
 HARRY D. KILGORE.

Copies of this patent may be obtained for five cents each, by addressing the "Commissioner of Patents, Washington, D. C."